(12) United States Patent  
Cho et al.

(10) Patent No.: US 9,371,816 B2  
(45) Date of Patent: Jun. 21, 2016

(54) HYBRID WAVE-CURRENT POWER SYSTEM

(71) Applicant: Korea Advanced Institute of Science and Technology, Daejeon (KR)

(72) Inventors: Yeunwoo Cho, Daejeon (KR); Seungyong Jeong, Daejeon (KR); Gibbeum Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/527,727

(22) Filed: Oct. 29, 2014

(65) Prior Publication Data

US 2015/0204303 A1  Jul. 23, 2015

(30) Foreign Application Priority Data

Jan. 20, 2014  (KR) .................. 10-2014-0006624

(51) Int. Cl.
*F03B 13/10* (2006.01)
*F03B 13/18* (2006.01)

(52) U.S. Cl.
CPC ....... *F03B 13/1855* (2013.01); *F05B 2220/707* (2013.01); *Y02E 10/28* (2013.01); *Y02E 10/38* (2013.01)

(58) Field of Classification Search
USPC ............... 290/42, 53; 60/495, 497, 500, 501; 417/330
See application file for complete search history.

(56) References Cited

U.S. PATENT DOCUMENTS

| | | | | |
|---|---|---|---|---|
| 3,696,251 A * | 10/1972 | Last | .................... | F03B 13/1855 290/53 |
| 4,249,084 A * | 2/1981 | Villanueva | ............ | F03B 13/187 290/53 |
| 4,539,485 A * | 9/1985 | Neuenschwander | .. | F03B 13/187 290/53 |
| 6,020,653 A * | 2/2000 | Woodbridge | ....... | F03B 13/1865 290/42 |
| 6,392,314 B1 * | 5/2002 | Dick | ..................... | F03B 13/148 290/53 |
| 7,323,790 B2 * | 1/2008 | Taylor | ................. | F03B 13/1895 290/42 |
| 7,355,293 B2 * | 4/2008 | Bernhoff | ................. | F03B 13/14 290/42 |
| 7,405,489 B2 * | 7/2008 | Leijon | ................... | F03B 13/189 290/42 |
| 7,420,287 B2 * | 9/2008 | Smushkovich | ..... | F03B 13/1845 290/42 |
| 7,498,685 B2 * | 3/2009 | Turner | ................ | F03B 13/1845 290/42 |
| 7,816,797 B2 * | 10/2010 | Nair | ....................... | H01L 41/125 290/42 |
| 9,169,823 B2 * | 10/2015 | Murphree | ............... | F03B 13/20 |

FOREIGN PATENT DOCUMENTS

| KR | 10-1007633 B1 | 1/2011 |
|---|---|---|
| KR | 10-2011-0067340 A | 6/2011 |
| KR | 10-2013-0000589 A | 1/2013 |
| KR | 10-2013-0081500 | 7/2013 |

* cited by examiner

*Primary Examiner* — Julio C. Gonzalez
(74) *Attorney, Agent, or Firm* — Fenwick & West LLP

(57) ABSTRACT

A hybrid power system including one or more base members configured to be installed at the seabed, one or more connecting members each coupled to a corresponding base member so as to be slidable in a vertical direction which is perpendicular to a top surface of the corresponding base member, a buoy configured to move in the vertical direction by receiving at least one of the wave force and current force, the buoy coupled to the top of the connecting member to move in conjunction with the one or more connecting members, and a power generation unit configured to generate electricity using vertical movement of the connecting members, the power generation unit installed in at least one of the one or more base members.

7 Claims, 8 Drawing Sheets

HYBRID WAVE-CURRENT POWER SYSTEM

CROSS-REFERENCE TO RELATED APPLICATIONS

This application is based on and claims priority from Korean Patent Application No. 10-2014-0006624, filed on Jan. 20, 2014, the disclosure of which is incorporated herein in its entirety by reference.

BACKGROUND

1. Field of the Invention

The present invention relates to a hybrid power system using wave force and current force.

2. Description of the Related Art

As an industry develops, fossil energy resources have been depleted. Recently, a renewable energy research has become active in order to replace such fossil energy resources. Moreover, in the aspect of the pollution caused by the fossil energy, the research has been focused on the development of clean alternative energy even among the renewable energies.

Clean alternative energies includes solar energy, wind energy, wave energy, current energy, tidal energy, geothermal energy, etc., and recently, power systems to generate electricity using said energies are being developed.

Wave power system using the wave energy generates electricity using wave force. In this regard, motion energy of surface of the sea periodically moving up and down is converted into electrical energy.

In general, the wave power system needs to be installed on the surface or underwater of deep sea, and thus it needs to be installed in the middle of the ocean. Accordingly, when the wave power system is damaged by, for example, hurricanes or tidal waves, it is difficult to repair it because of the poor access to where the wave power system is installed, which is the middle of the ocean. Also, transmission of the generated electricity is very costly. Further, when the wave is relatively gentle, the generating efficiency is reduced as the wave force is lessened.

Meanwhile, current power system using the current energy to generate electricity using a current (flow of water) of water. There are many places all over the world where a current occurs, such as ocean or river.

The current power system is typically installed underwater of deep sea where a current occurs more frequently. Thus, the wave power system, share the disadvantages of the wave power system being installed in the middle of the ocean. Further, the current power system only works when the current is strong, and less or no electricity is generated with weak or no current.

SUMMARY OF THE INVENTION

In view of the above, one or more embodiments of the present invention provide a hybrid power system using wave force and current force which prevents efficiency of generation of electricity from being decreased even if one of powers between the wave force and the current force is decreased by utilizing a combination of one or more of wave force and current force.

Further, one or more embodiments of the present invention provide a hybrid power system using wave force and current force which is installed in littoral sea close to the land where provides an easy access of administrator and thus is capable of providing an easy and convenient maintenance and reducing the cost of power transmission after generating electricity.

In accordance with an aspect of an embodiment of the present invention, there is provided a hybrid power system using at least one of wave force and current force, and being installed in littoral sea, the hybrid power system comprising: One or more base members configured to be installed at the seabed; One or more connecting members coupled to the corresponding base members so as to be slidable in a vertical direction which is perpendicular to a top surface of the corresponding base member; a buoy configured to move in the vertical direction by receiving at least one of the wave force and current force, the buoy being coupled to a top of the connecting members so as to move together with the connecting members; and a power generation unit configured to generate electricity using vertical movement of the connecting members, the power generation unit being installed in at least one of the base members.

Further, wherein the number of the base members and the connecting members are greater than one, respectively, and the base members are arranged to be spaced apart each other; and wherein one end of the buoy is coupled to a top of one of the connecting members and the other end of the buoy is coupled to a top of another connecting member. Further, in each of the base members, a guide portion is recessed from the top surface thereof in the vertical direction to guide a sliding motion of the connecting member coupled thereto.

Further, within the guide portion, a bearing member is installed to lessen a frictional force between the base member and the connecting member.

Further, wherein, a magnet is provided at the lower end of each of the connecting members, and in the power generation unit, a coil surrounding the magnet is provided to form an electric field.

Further, the buoy is detachably coupled to the connecting members using one or more coupling members.

Further, the buoy has a circular cross-sectional shape so as to be more influenced by the current force than the wave force.

Further, wherein the buoy has an oval or airfoil (wing-type) cross-sectional shape so as to be more influenced by the wave force than the current force.

Further, a coil spring is provided between each of the connecting members and the corresponding base member to restrict a vertical movement of the connecting members.

As set forth above, an embodiment according to the present invention may provide a hybrid power system using wave force and current force that is capable of improving the efficiency of generation in an ocean in a way of generating electricity by utilizing a combination of one or more of wave force and current force.

Furthermore, an embodiment according to the present invention may be installed in littoral sea where provides an easy access of administrator, thereby providing an easy and convenient maintenance and especially, reducing the cost of power transmission after generating electricity.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
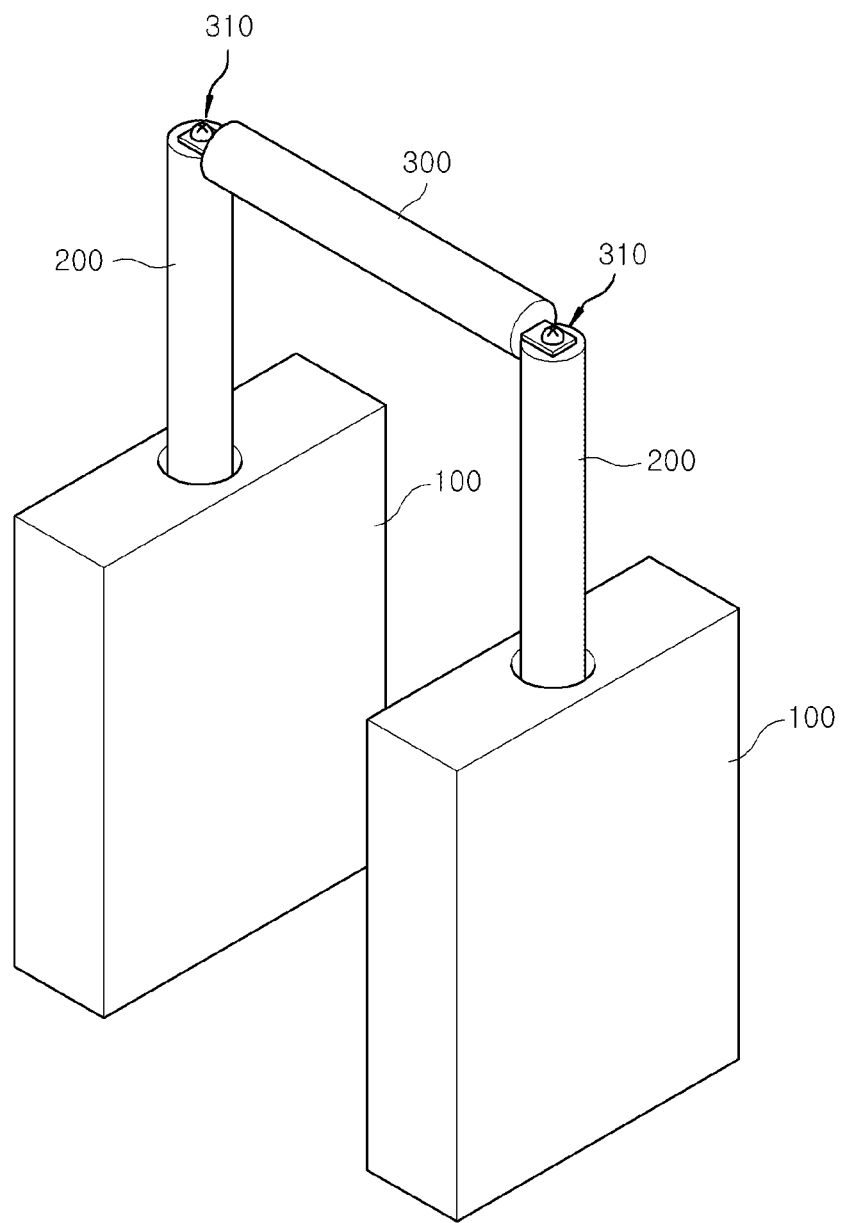
FIG. 1 is a perspective view illustrating a hybrid power system using a combination of wave force and current force, in accordance with an embodiment of the present invention.

Hereinafter, the configuration and operations of the embodiments of the present invention will be described in detail with reference to the accompanying drawings. The following description is any one of different aspects that can be claimed. In the following description, well-known configurations or functions will not be described in detail for the purpose of descriptive clarity.

The present invention may have various modifications imposed thereto and implemented in various embodiments, and thus particular embodiments will be illustrated in the drawings and will be described in detail in the best mode. However, it should be understood that the present invention is not intended to limit to those particular embodiments, and the present invention may encompass any modifications, equivalents, and alternatives embraced by the spirit and the technical scope of the present invention.

In this disclosure below, when one element is referred to as being 'coupled' or 'connected' to another element, it should be understood that the one element can be directly coupled or directly connected to the other element, but can be coupled or connected to the other element via an intervening element.

The terms used herein are employed only to describe specific embodiments, but are not intended to limit the present invention thereto. The representation of the singular, unless it clearly indicates in the context otherwise, includes multiple representations.

Hereinafter, the embodiments of the present invention will be described in detail with reference to the accompanying drawings.

Figure 2:
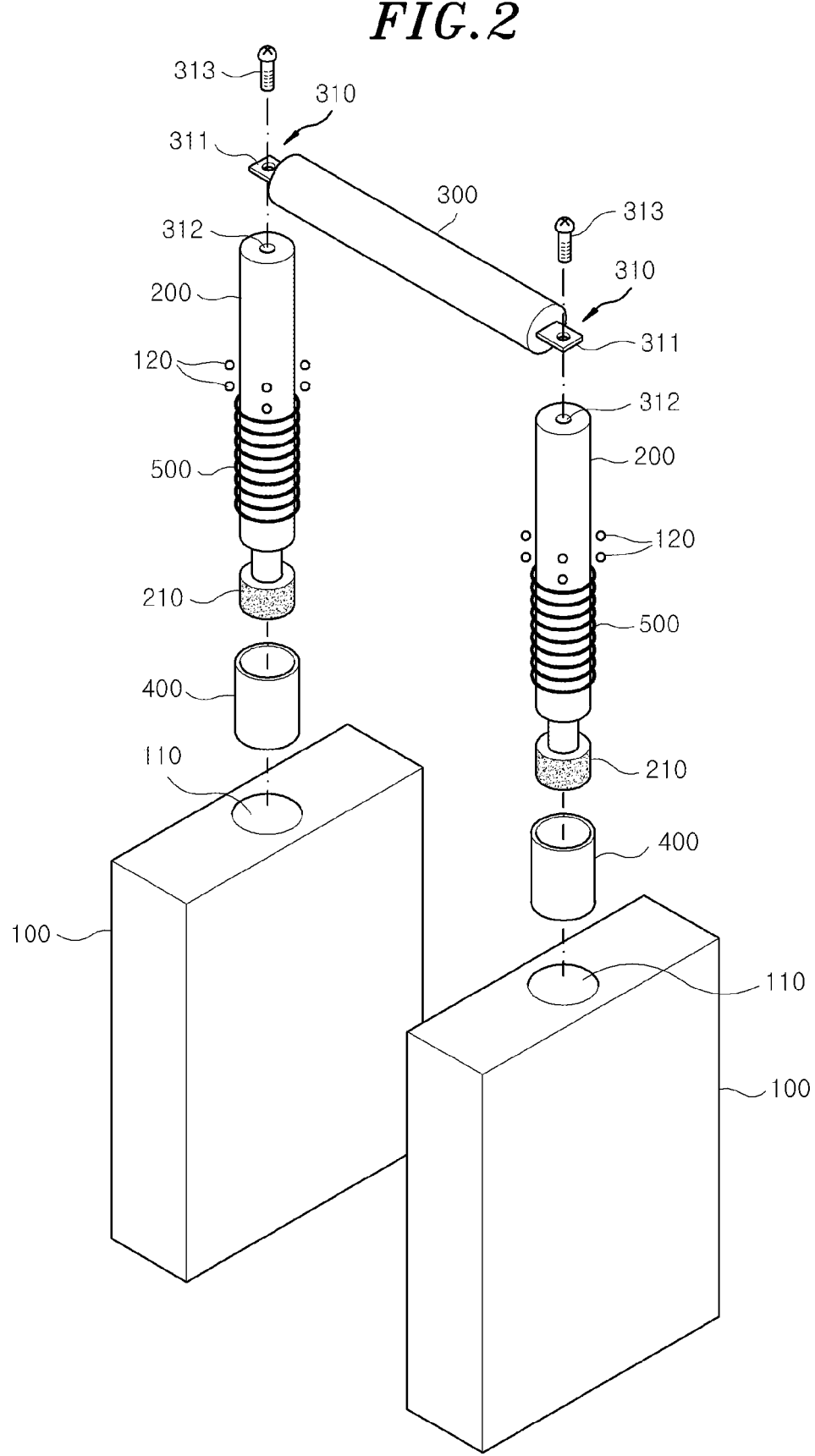
FIG. 2 is an exploded perspective view illustrating a hybrid power system using wave force and current force, in accordance with an embodiment of the present invention.

Referring to FIG. 1 and FIG. 2, a hybrid power system using wave force and current force according to an embodiment of the present invention generates electricity using at least one or more powers of the wave force and the current force occurred in the seawater. The hybrid power system may be installed in offshore relatively close to the land and may include one or more base members 100, one or more connecting members 200, a buoy member 300 and a power generation unit 400.

Even though an embodiment of the present invention is described to include the components as listed above, it should be understood that this embodiment is not consisted of such the components only and rather, the embodiment includes such the components as basic components. In other words, this embodiment may further include other components (for example, components well-known in the art of power system). However, well-known components will not be described in detail if they would obscure the gist of the invention.

The base member 100 may be installed in the seabed of a littoral sea. According to the present embodiment, the base member 100 may be provided with a plural number. In case where plural base members 100 are provided to face each other, the base members 100 may be arranged spaced apart at a predetermined distance.

Within the base member 100, a guide portion 110 may be formed to be recessed a predetermined depth from a top surface of the base member 100 along the longitudinal direction (vertical direction) of the base member 100, so as for the connecting member 200 to be inserted slidably.

Further, the connecting member 200 may be provided with a plurality corresponding to the number of the base members 100, and may be installed in each guide portion 110 of the base members 100 so as to be inserted slidably in a vertical direction.

The present embodiment is implemented for one connecting member 200 to be installed slidably in one base member 100, but is not limited thereto, and may vary in a variety. That is, in case where the base member 100 is formed of a larger one depending on needs, a plurality of connecting members 200 may be installed in one base member 100.

Further, a bearing member 120 may be installed in the guide portion 110 in order to reduce a frictional force against the connecting member 200. The bearing member 120 may support the connecting member 200 to move smoothly in a vertical direction, while maintaining contact with the outer circumferential surface of the connecting member 200.

That is, when the connecting member 200 slides in the vertical direction inside the guide portion 110, the bearing member 120 reduces the frictional force against the guide portion 110 so that the connecting member 200 can move smoothly in the vertical direction.

The bearing member 120 is installed in the guide portion 110 so that the bearing member 120 can be contacted to the outer circumferential surface of the connecting member 200.

The bearing member 120 may be implemented in a variety of forms, but may be a ball bearing which provides a relatively easy maintenance and excellent durability.

The bearing member 120 may include bearing components that are arranged a predetermined distance apart from each other with spacing at along the circumferential direction of the connecting member 200, and depending on needs, the bearing components may be arranged along the longitudinal direction of the connecting member 200 as well. Any one of the arrangements may be selected or changed into the other appropriately depending on needs of occasions.

Figure 3:
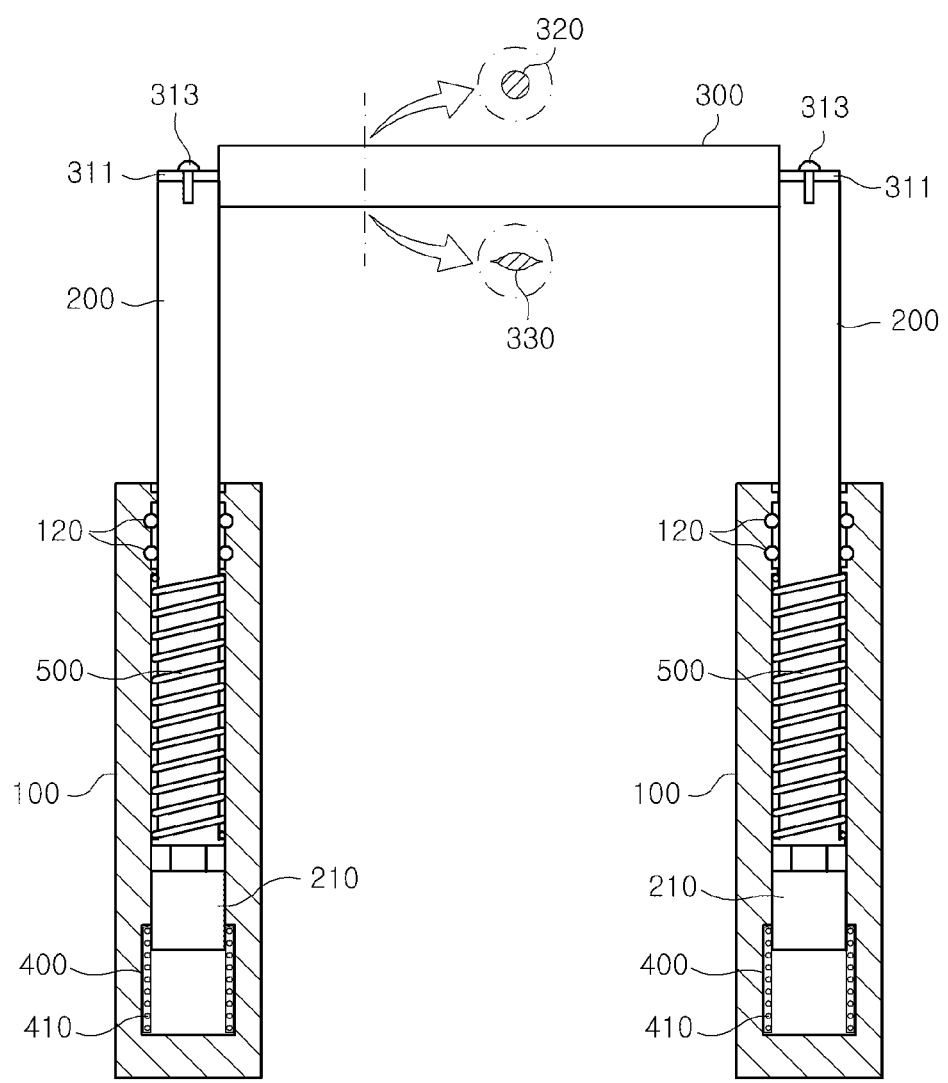
FIG. 3 and FIG. 4 are cross-sectional views illustrating a hybrid power system using wave force and current force, in accordance with an embodiment of the present invention.
Figure 4:
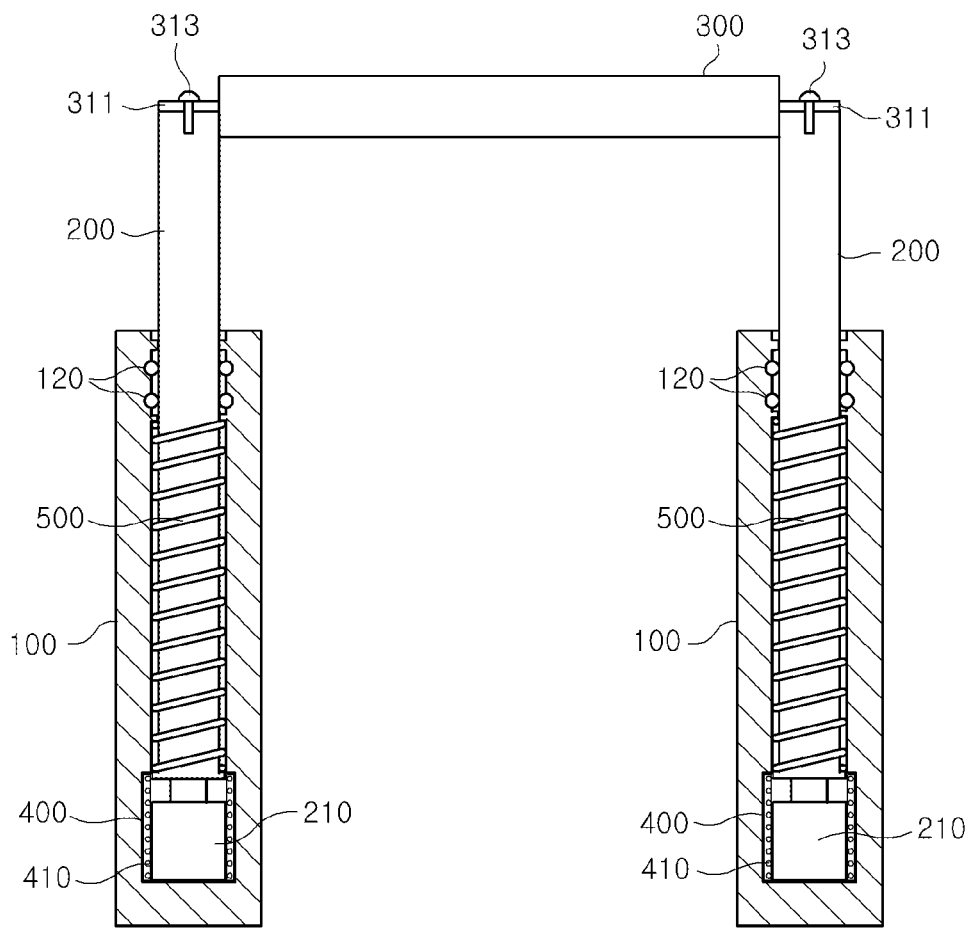

Referring further to FIG. 3 and FIG. 4, the buoy member 300 is arranged approximately at the top of the connecting member 200. The buoy member 300 may move in the vertical direction by directly receiving at least one of the wave force and the current force caused by the seawater, and may pass the force to the connecting member 200. Both ends of the buoy member 300 may be respectively coupled to the top of the connecting members 200.

The buoy member 300 may move together with the connecting members 200 due to the coupling of the buoy 300 to the connecting members 200. Since the buoy member 300 directly receives an external force such as the wave force and the current force, in a long term, the buoy member 300 may be worn and damaged. The worn and damaged buoy member 300 would need to be replaced with new one.

To prepare for the case in which the buoy member 300 needs to be replaced with new one, the buoy member 300 may be coupled detachably to the connecting member 200 using a coupling means 310 so that the buoy member 300 can be disassembled from the connecting member 200 when needed.

The coupling means 310 may include a coupling flange 311 protruded from both ends of the buoy member 300 in a longitudinal direction of the buoy 300, a coupling hole 312 formed at the top of the connecting member 200, and a fixing bolt 313 which couples the coupling flange 311 and the coupling hole 312 together so that the buoy member 300 is fixed to the connecting members 200.

The coupling flange 311 may be adjusted to be positioned in line with the coupling hole 312 of the connecting member 200, the couple flange 311 and the coupling hole 312 are fixed by the fixing bolt 313 for the buoy member 300 to be coupled to the connecting members 200, so that the buoy 300 moves together with the connecting members 200.

When the buoy member 300 is needed to be replaced with new one, after the fixing bolt 313 is disassembled, a new buoy may be in turns coupled to the connecting member 200 through the above mentioned step.

Meanwhile, the buoy member 300 moves in the vertical direction by a combination of influences of wave force and current force. The wave force and the current force may be different in magnitudes depending on marine environments or places where the buoy member 300 is installed.

In order to increase the movement of the buoy member 300 in the vertical direction in response to the wave force and the current force which may have different magnitudes, the buoy member 300 may have a variety of cross-sectional shapes.

As shown in FIG. 3, the buoy member 300 according to the present embodiment may have a circular cross-sectional shape in order to be more influenced by the current force than the wave force. In case where the buoy member 300 has a circular cross-sectional shape, when the current passes over the buoy member 300 at the point, asymmetric vortexes may be induced in the upper and lower portions, respectively, at the rear of the buoy member 300. The buoy member 300 is able to move in the vertical direction due to the pressure difference caused by such asymmetric vortexes.

In order to help understanding the above description, hereinafter, FIG. 5 will be referred.

Figure 5:
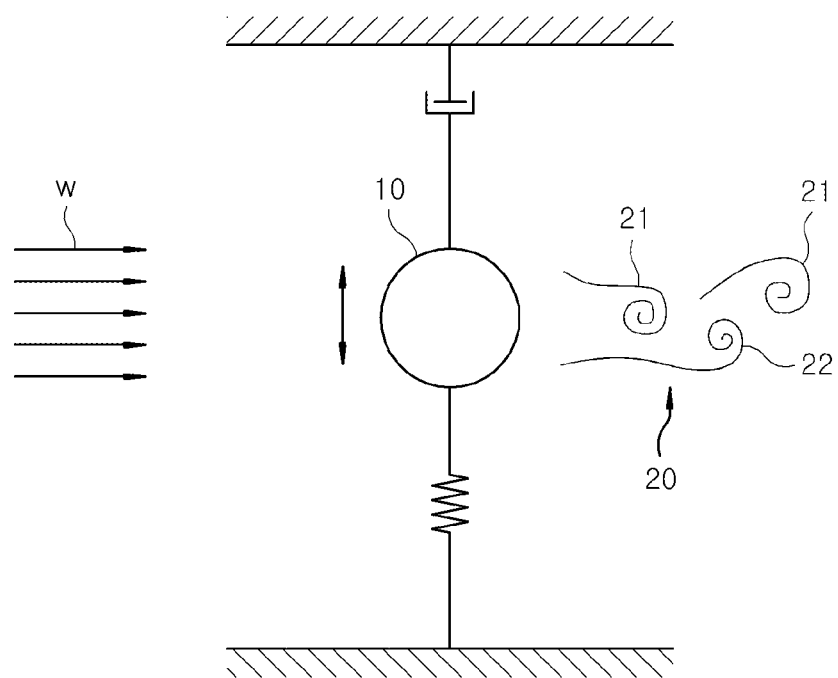
FIG. 5 is a reference view illustrating a floating movement of a circular cross-sectional member caused by current force.

FIG. 5 is a reference view illustrating a movement of a circular cross-sectional member caused by the current force. As shown in FIG. 5, when a circular cross-sectional member 10 is installed in the path of the current, a vortex 20 (whirlpool) is generated at the rear of the circular cross-sectional member 10.

The vortexes 20 are generated at the upper portion 21 and lower portion 22 respectively at the rear of the circular cross-sectional member 10. The generated vortexes become to be asymmetric having different pressures magnitudes. Due to such asymmetric vortexes, the circular cross-sectional member 10 is forced to move vertically, repeating upward and downward motion by turns.

Since the asymmetric vortexes will be maximized when the cross-sectional shape of the buoy member 300 is a circle, at the location where the current force is relatively larger than the wave force, the buoy member 300 may be formed to have a circular cross-sectional shape 320 in order to enhance the vertical movement of the buoy member 300.

On the other hand, the buoy member 300 may be formed of an airfoil (wing-type) cross-sectional shape 330 in order to be more influenced by the wave force than the current force.

When the buoy member 300 has an oval or airfoil cross-sectional shape 330, influences of the current force on the buoy 300 may be decreased compared to the one with the circular cross-sectional shape, but influences of the wave force (force generated by waves) may be increased compared to the one with the circular cross-sectional shape.

An experiment on the influences of the wave and current force on the buoy 300 according to its cross-sectional shape has been conducted. As a result, the experiment showed that the influence of the current force is greater when the cross-sectional shape is closer to a circle, and the influence of the wave force is greater when the cross-sectional shape is closer to a flat panel.

Although the present embodiment refers to a power system using a combination of the wave force and the current force, depending on the location where the system is installed, the buoy member 300 to be installed in a location where the current force is relatively larger may have a circular cross-sectional shape, and the buoy member 300 to be installed in a location where the wave force is relatively larger may have an oval or airfoil cross-sectional shape.

A power generation unit 400 may be installed in each base member 100. The power generation unit 400 may generate electricity using the vertical movement of the connecting member 200. To accommodate the lower end of the connecting member 200, the power generation unit 400 may be formed of a cylindrical shape. This enables the lower end of the connecting member 200 to move in the vertical direction, while the lower end is inserted in the power generation unit 400.

A magnet 210 may be provided at the lower end of the connecting member 200, and a coil 410 may be installed within the power generation unit 400. The coil 410 is wound around the magnet 210 and forms an electric field when predetermined current flows therein.

Thus, when the lower end of the connecting member 200 having the magnet 210 installed therein begins to move in the vertical direction through an inner space of the wound coil 410 in which the predetermined current flows according to the laws of Maxwell, electricity may be generated. Since such a power generation principle is generally accepted as a well-known technology, a detailed description thereof is omitted in the specification.

Between the base member 100 and the connecting member 200, a coil spring 500 that restricts a vertical movement of the connecting member 200 may be provided.

The coil spring 500 may be provided to surround the outer circumferential surface of the connecting member 200. One end of the coil spring 500 may be fixed at the connecting member 200, and the other end of the coil spring 500 may be fixed at the base member 100. With this configuration, the coil spring 500 is able to repeatedly compressed and elongated depending on the movement of the connecting member 200.

Thus, the coil spring 500 repeatedly being compressed and elongated restricts excessive movement of the connecting member 200 so as for the connecting member 200 to move less than or equal to a preset displacement. Therefore, the length of the coil spring 500 may be set within a range in which the lower portion of the connecting member 200 stays within the power generation unit 400.

Referring to FIG. 3 and FIG. 4, when the buoy member 300 moves in the vertical direction due to the influences of at least one of the wave force and the current force, the motive force of the buoy member 300 is transmitted to the connecting member 200, thereby enabling the connecting member 200 to move in the vertical direction as well.

Since the coil spring 500 that is compressed and elongated as the connecting member 200 moves in the vertical direction restrict excessive movement of the connecting member 200 the connecting member 200 is capable of moving vertically within a predetermined range.

When the connecting member 200 begins to move vertically, the magnet 210 at the lower end of the connecting member 200 also begins to move vertically within the power generation unit 400, thereby generating electricity.

Further, the length of the coil spring 500 determines the initial height of the buoy member 300 when no external force is applied to the buoy member 300 at all. Therefore, the length of the coil spring 500 may be set aptly in consideration of the marine environment or a location where the buoy member 300 is installed.

Hereinafter, referring to FIG. 6, a hybrid power system using wave and a current forces in accordance with another embodiment of the present invention will be described.

Figure 6:
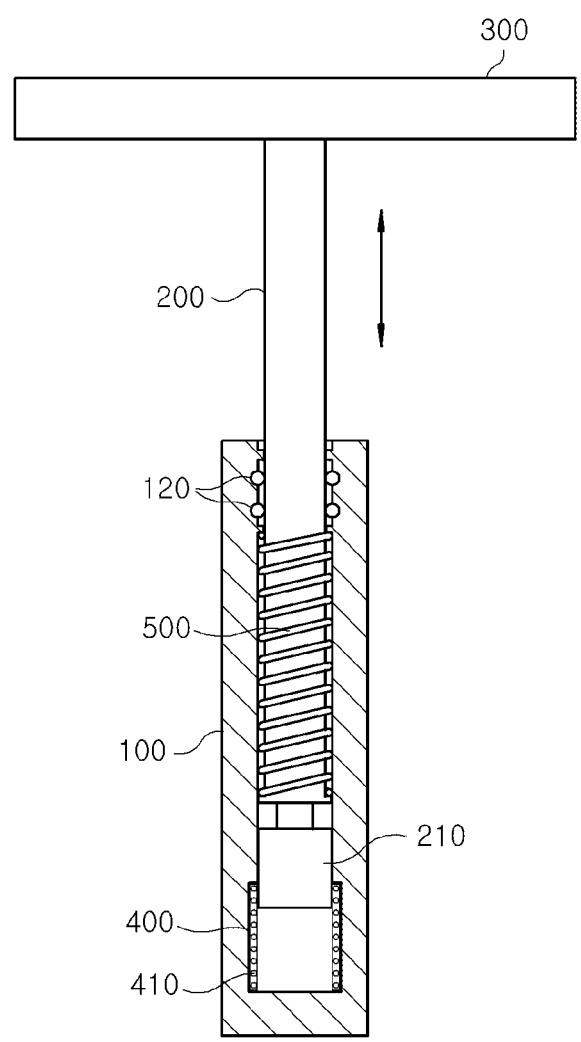
FIG. 6 is a cross-sectional view illustrating a hybrid power system using wave force and current force, in accordance with another embodiment of the present invention.

As shown in FIG. 6, another embodiment of the present invention may include the base member 100, the connecting member 200, the buoy member 300 and the power generation unit 400. Unlike the foresaid embodiment, only a single number of the base member 100, the connecting member 200 and power generation unit 400, respectively, may be provided, not the plural number. Since the functions and names of components of this embodiment are the same with the foresaid embodiment, the same reference numerals are used.

The base member 100 may be installed in the seabed as previously described. In this embodiment, the base member 100 is the same as before except that the base member 100 is provided as a single number, and thus detailed description thereof can be referred to the foresaid embodiment.

Further, the connecting member 200 may be installed to be slidable in the vertical direction, which is the direction perpendicular to the based member 100, as previously described. In this embodiment, the connecting member 200 is the same as before except that the connecting member 200 is provided as a single number, and thus detailed description thereof also can be referred to the foresaid embodiment.

Likewise, an end of the buoy member 300 may be coupled to the connecting member 200 so that the buoy member 300 and the connecting member 200 can move together. The buoy member 300 may move in the vertical direction due to at least one of the wave force and the current force.

In this embodiment, the buoy member 300 may be coupled to the top of the connecting member 200. Considering the balance of right and left sides, a middle portion of the buoy member 300 may be coupled to the connecting member 200. Accordingly, the coupling structure of the buoy member 300 and the connecting member 200 may have T-shape in general. This embodiment is the same as the foresaid embodiment except for the differences described above, and thus detailed description thereof can be referred to the foresaid embodiment.

Further, the power generation unit 400 may be installed in the base member 100 and generate electricity by means of vertical movement of the connecting member 200. In this embodiment, the base member 100 and the connecting member 200 are, respectively, provided as a single number, and accordingly, the power generation unit 400 also is provided as a single number. This embodiment is the same as the foresaid embodiment except for the number of the components, and thus detailed description thereof can be referred to the foresaid embodiment.

Hereinafter, referring to FIG. 7 and FIG. 8, operation of a hybrid power system using wave force and current force according to an embodiment of the present invention will be described.

Figure 7:
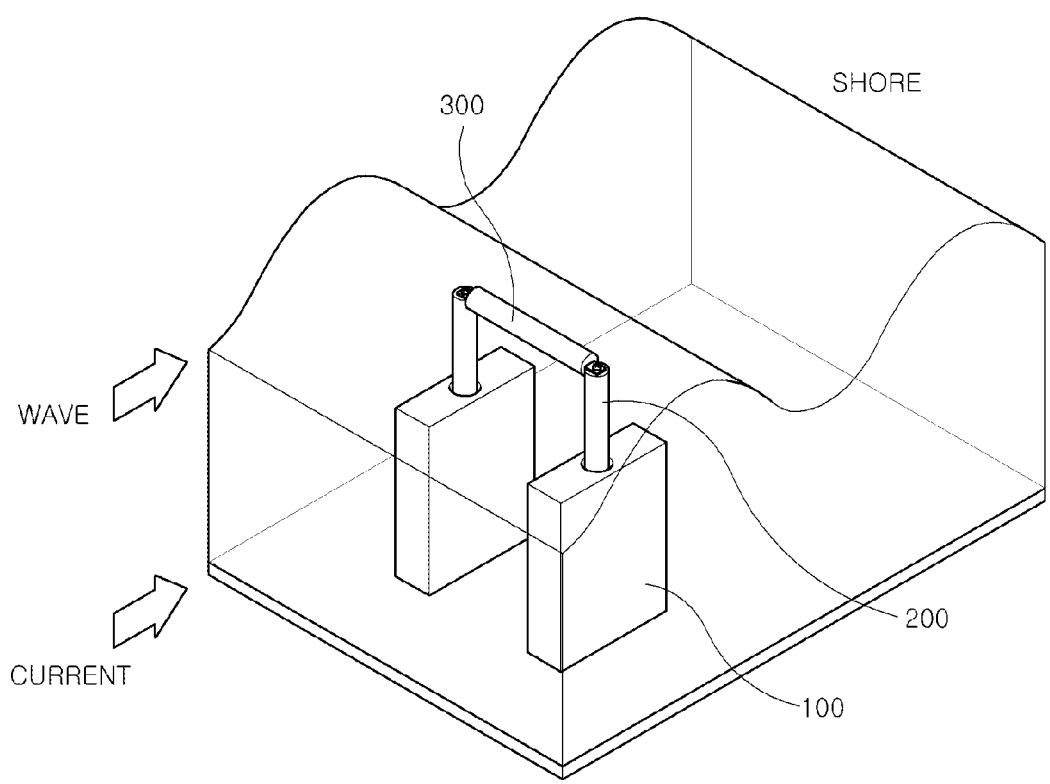
FIG. 7 and FIG. 8 are state diagrams illustrating operations of a hybrid power system using wave force and current force, in accordance with an embodiment of the present invention.
Figure 8:
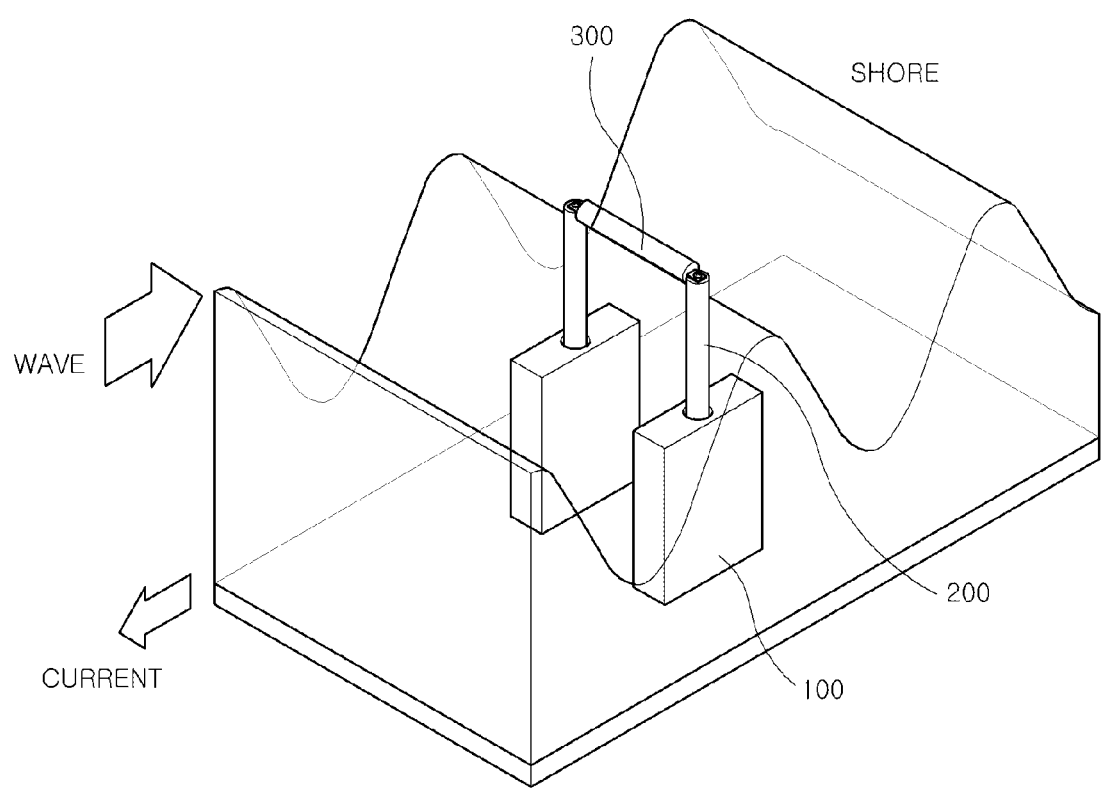

In both of FIG. 7 and FIG. 8, the right portion refers to the shores. A hybrid power system using wave force and current force according to the present embodiment may be installed in a littoral sea close to shore.

FIG. 7 illustrates marine environments where the directions and the magnitudes of wave force and current force are similar to each other. Typically, the directions of wave force and current force will be the same at flood tide, and the magnitudes of wave force and current force may vary depending on the location within the ocean.

In case where the directions and the magnitudes of wave force and current force are the same, the buoy member 300 may move in the vertical direction due to the pressure difference caused by a difference of the peak of the wave when the waves pass over. In addition, when the direction of wave force and current force are the same, the vertical motive force of the moving buoy member 300 may be more increased, due to a pressure difference caused by asymmetric vortexes occurring in the upper and lower portions of the rear of the buoy member 300. Therefore, as the present embodiment uses a combination of wave force and current force, the vertical movement of the buoy member 300 can be increased, thereby improving the efficiency of generation of electricity. Also, even if one of the wave force and the current force is decreased because of changes of the marine environments, the other force is still available to use. Thus, the efficiency of generation of electricity may be maintained at the level similar to that of a conventional power system that uses either of the wave force and the current force.

FIG. 8 illustrates a marine environment where the directions of wave force and current force are different to each other, and the magnitude of wave force is greater than that of the current force. Typically, such a marine environment may occur at low tide.

In the marine environment as shown in FIG. 8, since the buoy member 300 is less affected by the current force compared to the case of FIG. 7, the vertical movement of the buoy 300 due to the current force may be significantly reduced. However, as the buoy member 300 is relatively more affected by the wave force, the vertical motive force of the moving buoy 300 may not be substantially decreased. Accordingly, the overall efficiency of power generation may still be maintained.

Hereinbefore, while the present invention has been described in connection with various embodiments of the invention, the scope of protection of the present invention is not limited to the particular embodiments, and it will be understood by those skilled in the art that various changes and modifications may be made without departing from the scope of the embodiments of the present invention and are intended to be embraced by the scope of the present invention.

What is claimed is:

1. A hybrid power system installed in littoral sea and using at least one of wave force and current force to generate electricity, the hybrid power system comprising:
   a plurality of base members configured to be installed at a seabed;
   a plurality of connecting members each coupled to a corresponding base member and slidable in a vertical direction which is perpendicular to a top surface of the corresponding base member;
   a buoy configured to move in the vertical direction by receiving at least one of the wave force and current force, one end of the buoy is coupled to a top of one of the connecting members and another end of the buoy is coupled to a top of another connecting member to move in conjunction with the connecting members; and
   at least one of power generation unit configured to generate electricity using vertical movement of the connecting members, the power generation unit installed in at least one of the base members,
   wherein a guide portion is recessed from the top surface of each of the base member in the vertical direction to guide a sliding motion of a connecting member received in each of the base members.

2. The hybrid power system of claim 1, wherein within the guide portion, a bearing member is installed to reduce a frictional force between the base member and the connecting member.

3. The hybrid power system of claim 1, wherein a magnet is provided at a lower end of each of the connecting members, and in the power generation unit, a coil surrounding the magnet is provided to form an electric field.

4. The hybrid power system of claim 1, wherein the buoy is detachably coupled to the connecting members using one or more coupling members.

5. The hybrid power system of claim of 1, where the buoy has a circular cross-sectional shape so as to be more influenced by the current force than the wave force.

6. The hybrid power system of claim 1, wherein the buoy has an oval or airfoil shaped cross-section to increase influence by the wave force relative to the current force.

7. The hybrid power system of claim 1, wherein a coil spring is provided between each of the connecting members and the corresponding base member to restrict a vertical movement of the connecting members.

* * * * *